US006497162B2

(12) United States Patent
Spurr

(10) Patent No.: US 6,497,162 B2
(45) Date of Patent: Dec. 24, 2002

(54) POWER ACTUATOR ARRANGEMENT

(75) Inventor: Nigel Victor Spurr, Hall Green (GB)

(73) Assignee: Meritor Light Vehicle Systems (UK) Limited (GB)

( * ) Notice: Subject to any disclaimer, the term of this patent is extended or adjusted under 35 U.S.C. 154(b) by 0 days.

(21) Appl. No.: 09/816,206

(22) Filed: Mar. 23, 2001

(65) Prior Publication Data

US 2001/0023620 A1 Sep. 27, 2001

(30) Foreign Application Priority Data

Mar. 23, 2000 (GB) .............................................. 0006930

(51) Int. Cl.[7] .............................. E05C 3/06; F16H 1/02

(52) U.S. Cl. .................. 74/421 A; 74/412 R; 292/201; 292/DIG. 23

(58) Field of Search .......................... 74/421 A, 412 R; 292/201, DIG. 23, 216, 48, 223, DIG. 65; 70/277, 279.1, 264, 279

(56) References Cited

U.S. PATENT DOCUMENTS 6,382,686 B1 * 5/2002 Ishigaki et al. ...... 292/DIG. 23
2001/0023620 A1 * 9/2001 Spurr ....................... 74/412 R

* cited by examiner

*Primary Examiner*—Douglas C. Butler
(74) *Attorney, Agent, or Firm*—Carlson Gaskey & Olds

(57) ABSTRACT

A power actuator arrangement including a power drive assembly having a first powered position and a second powered position and an output device, the output device being unmoveable by the power drive assembly between a first detent position corresponding to the first powered position and a second detent position corresponding to the second powered position following powered operation, the output device being retained in the first or second detent positions by a detent bias force provided by a detent arrangement, the output device being independently movable by an independent force between the first and second detent positions, the independent force acting to overcome the detent bias force such that during independent movement the independent force substantially does not move the power drive assembly between its first powered and second powdered positions.

37 Claims, 4 Drawing Sheets

POWER ACTUATOR ARRANGEMENT

BACKGROUND OF THE INVENTION

The present invention relates to power actuator arrangements and in particular power actuator arrangements for providing a child safety on/off feature, a lock/unlock feature or a superlock/unsuperlock feature on a car door latch.

When known power actuator arrangements are used for locking and unlocking of a vehicle door latch, a provision is made for manual override. Thus a vehicle door latch which has been power unlocked by a central door locking system can subsequently be manually locked by the driver depressing a cill button or the like. Under such circumstances the cill button preferably has to be provided with a detent position to ensure that the cill button stays in either a filly raised or fully lowered position and not in a midway position. Under such circumstances the motor of the power actuator arrangement has to be powerful enough to not only drive the latch mechanism between lock and unlock but also has to overcome the detent forces.

In particular the detent forces have to be sufficiently high to provide a good tactile feel and also to ensure that inertia forces resulting from a road traffic accident do not overcome the detent forces and change the state of the lock.

SUMMARY OF THE INVENTION

Thus according to the present invention there is provided a power actuator arrangement including a power drive assembly having a first powered position and a second powered position and an output means, the output means being moveable by the power drive assembly between a first detent position corresponding to the first powered position and a second detent position corresponding to the second powered position following powered operation, the output means being retained in the first or second detent positions by a detent bias force provided by a detent arrangement, the output means being independently moveable by a independent force between the first and second detent positions, the independent force acting to overcome the detent bias force such that during independent movement the independent force substantially does not act to move the power drive assembly between its first powered and second powered positions.

According to a further aspect of the present invention there is provided a power actuator arrangement including a power drive assembly and an output means, the output means being movable by the power drive assembly between first and second positions and being independently movable by an independent force between the first and second positions such that the first and second positions are detent position and during independent movement between the first and second positions the independent force has to overcome a detent force in which the power drive assembly has to overcome a reduced detent force when moving the output means between the first and second positions.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
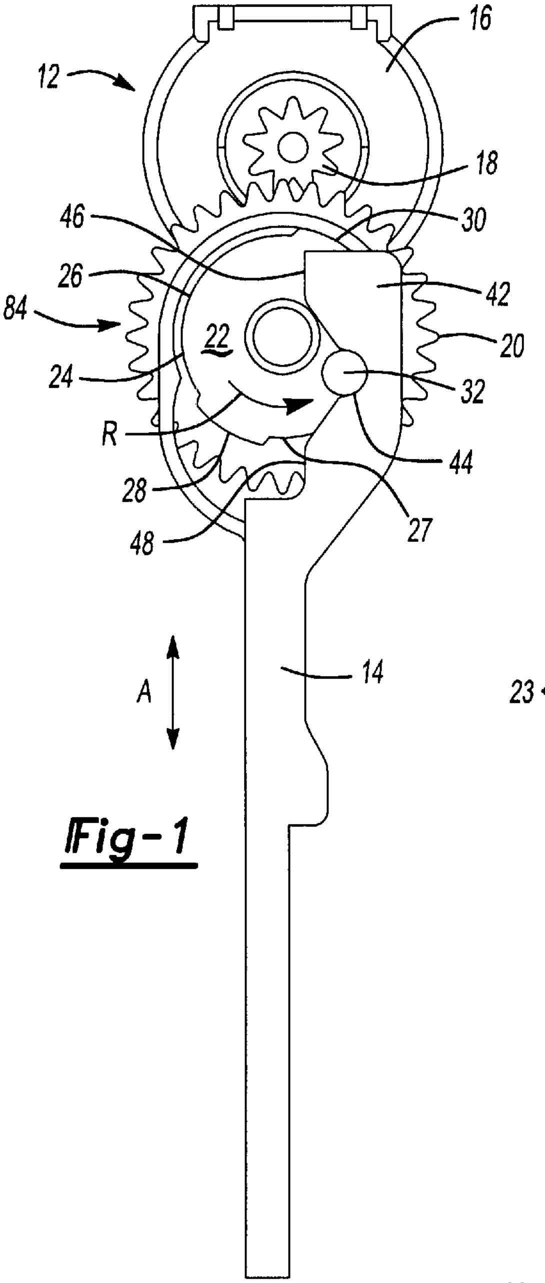
FIG. 1 is a front view of the power actuator arrangement according to the present invention during powered operation.
Figure 2A:
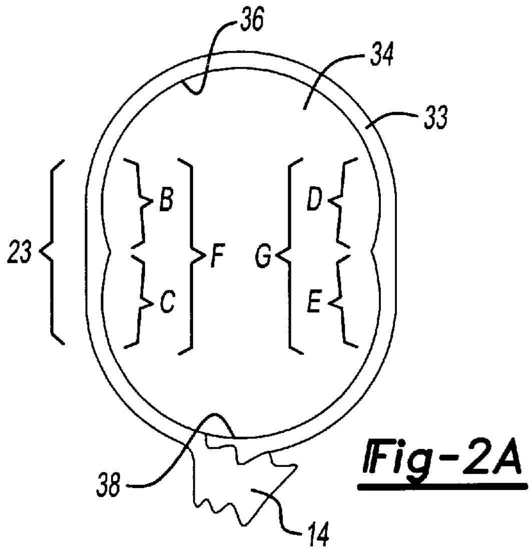
FIG. 2A is a partial cut away view of FIG. 1.
Figure 2:
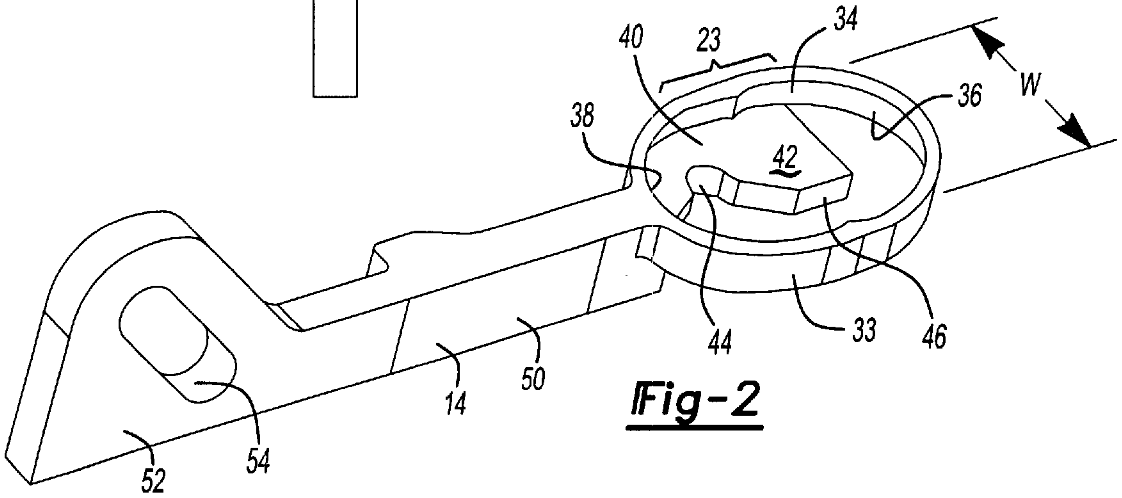
FIG. 2 is an isometric view of the output means of FIG. 1.

With reference to FIGS. 1 and 2 there is shown a power actuator arrangement 10 which includes a power drive assembly 12, an output means 14 and a detent arrangement 84. The power drive assembly includes a power actuator in the form of a motor 16 driving a pinion 18 which engages and drives gear 20. Gear 20 is rotationally fast with a drive abutment in the form of a crank pin 32. The drive pin 18, gear 20 and crank pin 32 combine to form a transmission path of the power drive assembly.

The detent arrangement 84 includes a first member in the form of a cam 22 and a second member in the form end portion 23 of output means 14.

The cam 22 is secured rotationally fast to gear 20. Cam 22 has a cam surface 24 being profiled with base circle portion 26 and 27 (also known as third and fourth outwardly facing surfaces) and two symmetrically diametrically opposed cam lobes 28 and 30 (also known as first and second outwardly facing surfaces).

End portion 23 includes a twin lobed recess 34 having first arcuate portion 36 and second arcuate portion 38, the centres of arcuate portions 36 and 38 being different. The first and second arcuate portions combine to form a wasted region 40 of width W.

Accurate portion 36 includes portion B (see FIG. 2A) ie that portion of arcuate portion 36 abutted by one of the cam lobes (in the case of FIG. 3, cam lobe 30) when the output means 14 is in the lowered position. A similar portion C of arcuate portion 38 can be defined as that portion abutted by one of the cam lobes when the output means is in the raised position. Corresponding portions D of arcuate portion 36 and E of arcuate portion 38 can be defined as those portions contacted by one of the cam lobes 28 and 30 when the output means 14 is in the lowered and raised position respectively. The combination of portions B and C combine to form a first inwardly facing surface F of the end portion 23 and the combination of portions D and E combine to form a second inwardly facing surface G of the end portion 23.

Wall 33 defines the twin-lobbed recess 34 and is relatively thin. Proximate and facing the twin lobbed recess 34 is a flange portion 42 having a driven recess 44 and a first and second stop abutments 46 and 48.

An arm 50 of output means 14 is integrally formed with the wall 33 and flange portion 42 and includes at its distal end 52 an arcuate slot 54. The cam 22 is positioned within the recess 34.

Figure 3:
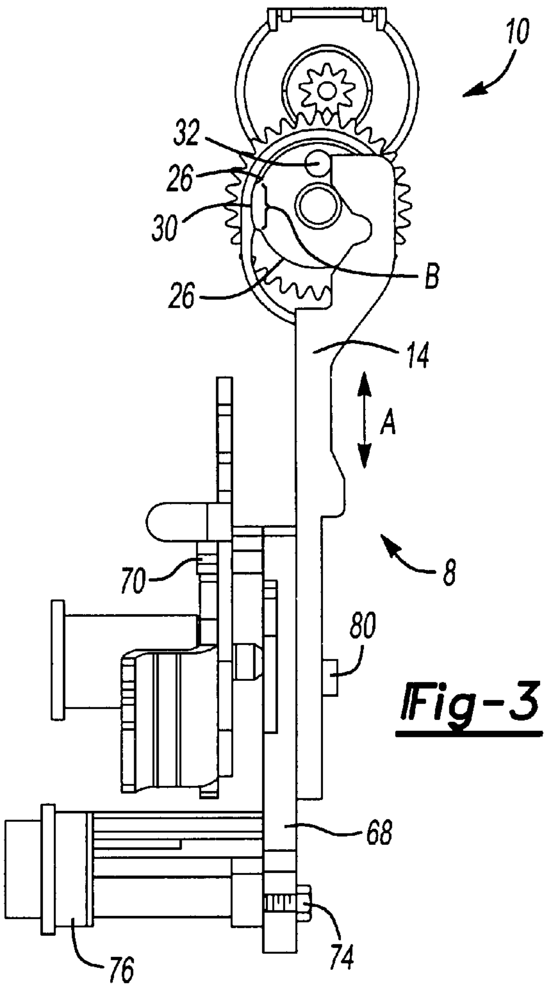
FIGS. 3, 4, 5 and 6 are front, isometric, rear and side views of the power actuator arrangement of FIG. 1 being used to actuate a child safety arrangement of a door latch.
Figure 4:
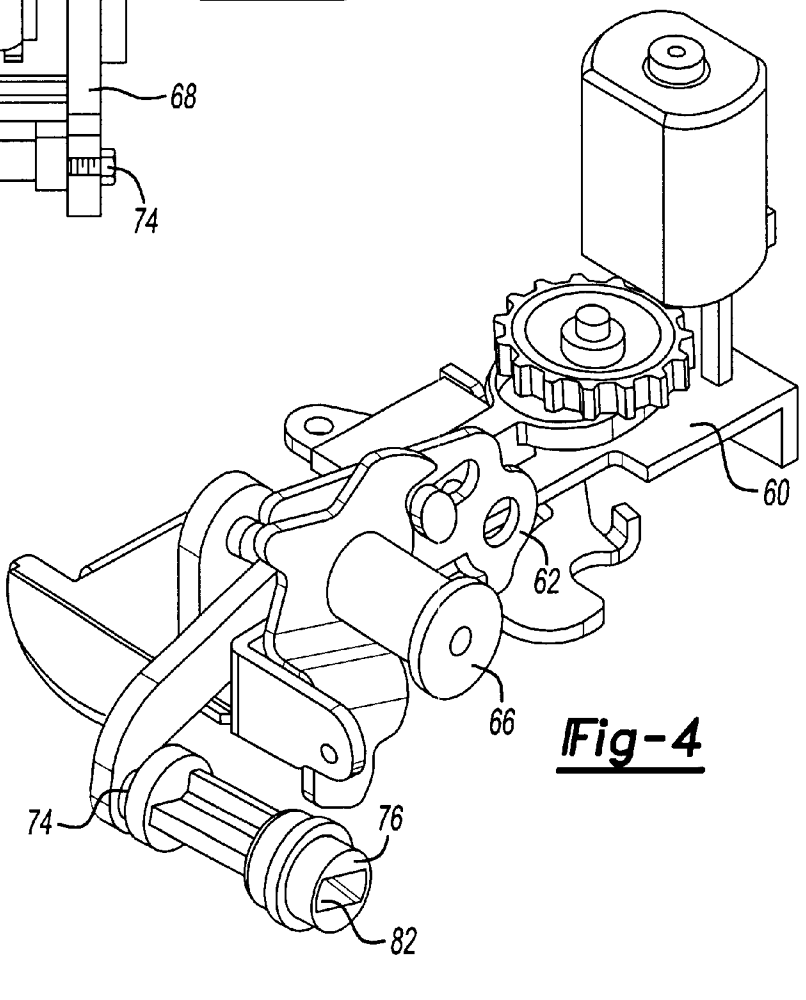

The output means 14 can be moved reciprocally in the direction of arrow A by selective operation of the motor between a lowered first detent position (as shown in FIGS. 1 and 3) and a raised second detent position. Additionally the output means 14 can be manually moved between the first and second detent positions by actuation of the pin 80, situated in slot 54, in the direction of arrow A.

The power drive assembly has a first powered position as shown in FIG. 3 wherein crank pin 32 is situated at the 12 o'clock position and a second powered position wherein crank pin 32 is situated at the 6 o'clock position when viewing FIG. 3. As described below when the output means is moved by the power drive assembly between the first detent position and second detent position, these detent positions correspond respectively to the first and second powered positions of the power drive assembly.

However, as further described below, following independent movement of the output means the output means can be moved to its second detent position whilst the power drive assembly remains in its first powered position and similarly the output means can be moved to its first detent position whilst the power drive assembly remains in its second powered position.

With the actuator arrangement positioned as shown in FIG. 3 the crank pin 32 abuts first stop abutment 46 and the cam lobe 28 and 30 are positioned horizontally relative to each other when viewing FIG. 3 and are in contact with first arcuate portion 36 of twin lobed recess 34.

It should be noted that the diameter across cam lobes 28 and 30 is substantially the same as the diameter across first arcuate portion 36 and second arcuate portion 38, and that the diameter across the base circle portion 36 is substantially similar to distance W across the wasted region 40.

Lifting of pin 80 (as described below) causes the output means 14 to move upward when viewing FIG. 3 such that the wasted region 40 rides over cam loads 28 and 30 thus springing wall 33 apart. Continued movement of the output means upward results in the cam lobes 28 and 30 snapping into engagement with second arcuate portion 38.

Thus the cam lobes 28 and 30 in conjunction with waste portion 40 provide for an upper and lower detent position of the output means 14.

It should be noted that the cam lobes 28 and 30 are symmetrical as is either side of the wasted portion. Thus manual movement of the output means 40 between its first and second position does not produce any turning moment on cam 22. Thus there is no tendency for cam 22 to rotate during manual movement.

With the power actuator arrangement 10 positioned as shown in FIG. 3 the motor can be energised such that it rotates in a clockwise direction causing the gear 20 to rotate in an anti-clockwise direction. Thus crank pin 32 will move from the twelve o'clock position anti-clockwise, in the direction of arrow R, to the four o'clock position as shown in FIG. 1 whereupon it will engage driven recess 44 and cause the output means 14 to move from its first lower to its second raised position. Continued energization of the motor will cause the crankpin 32 to continue to move in an anticlockwise direction past the twelve o'clock position and around to the six o'clock position whereupon it will abut second stop abutment 48.

It should be noted that the crank pin 32 has just started to engage in recess 44 when crank pin 32 is at the four o'clock position and consequently the output means 14 is fully raised when the crank pin 32 is in the two o'clock position. Note that cam lobe 28 moves between a seven o'clock and five o'clock position and cam lobe 30 moves between a one o'clock and eleven o'clock position during movement of the output means 14 from its first to second position and that wasted portion 14 thus only has to pass over base circle portion 26. Since the width W of wasted portion 40 is substantially the same as the diameter of the base circle portion 26 there is no detent force to overcome when the output means is moved between its first and second positions by the motor 16.

With the output means raised to its second position by the motor 16. Actuation of the motor in an anticlockwise direction will cause drive gear 20 to rotate through 540° in a clockwise direction such that crank pin 32 moves one and half turns from a six o'clock to the twelve o'clock position moving the output means 14 from its raised second position to its lowered first position.

In the event of manual movement of output means 14 from its lowered first position as shown in FIG. 3 to its raised second position, in the absence of movement of the motor, subsequent actuation of the motor in a clockwise direction will result in anti clockwise rotation of the gear 20. However the crank pin 32 will only move through until such time as it contacts second stop abutment 48 which has been moved to a raised position as a result of manual movement of the output means.

As described above, in this case the power actuator arrangement drives a vehicle car door latch between a child safety on and a child safety off position as described below.

A latch arrangement 8 includes the power actuator arrangement 10 mounted on a chassis 60. An inside handle lever 62 (connected to an inside door handle) and an inside release lever 64 are both pivotally mounted on the chassis 60 about pivot 66. A child safety link 68 lies substantially parallel to the inside handle lever 62 and inside release lever 64 and includes at an upper portion a clutch pin 70 which slideably engages slot 72 of inside handle lever 62. Projecting on other side of child safety link 78 is pin 80 which engages slot 54 as described above.

A lower portion of the child safety link 68 engages with a crank pin 74 of child safety operating crank 76.

Figure 6:
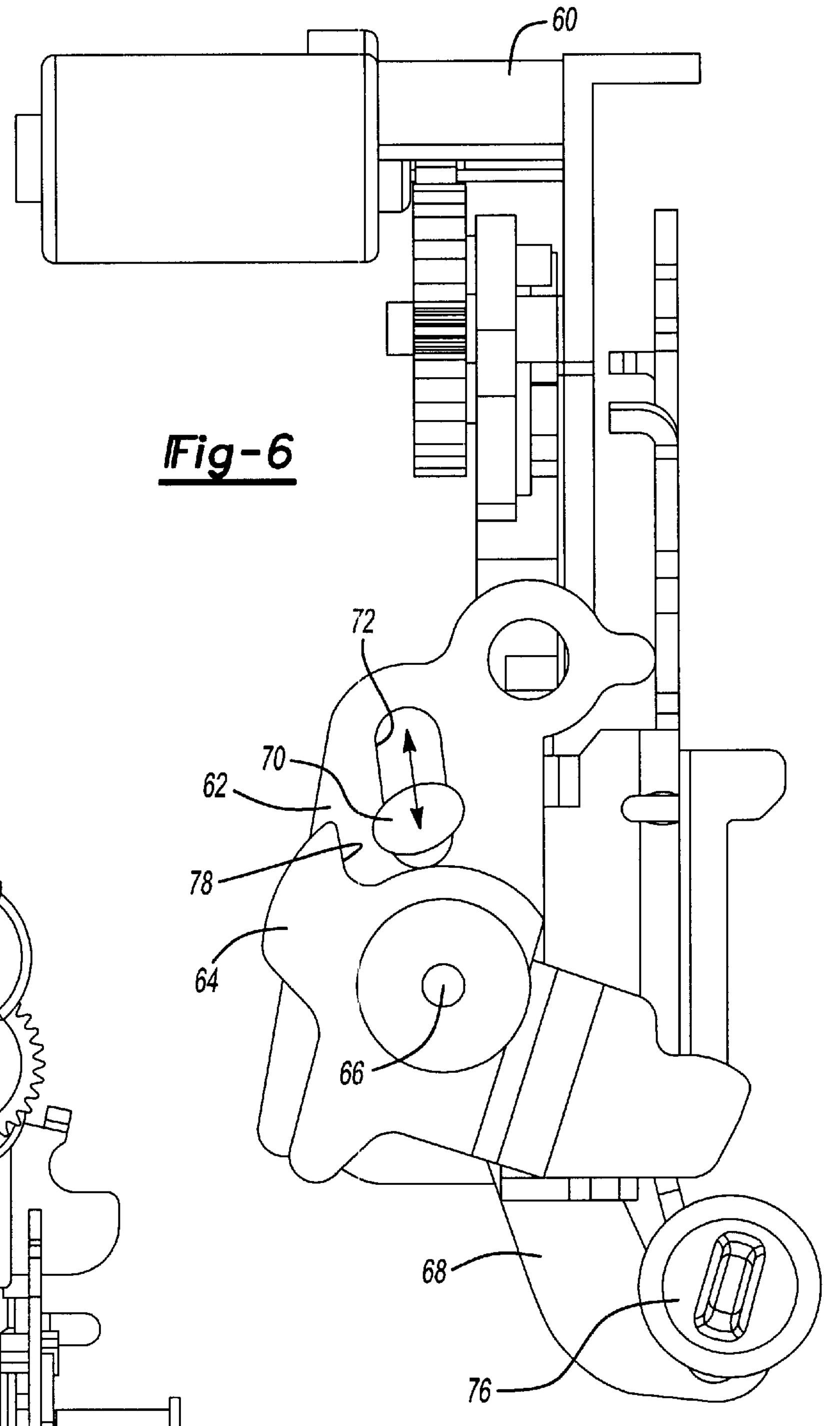
Figure 5:
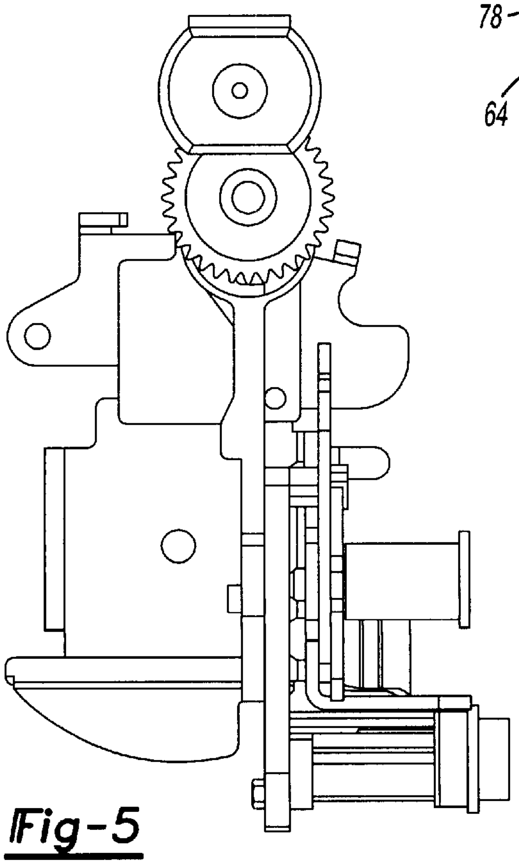

Operation of an inside door handle causes inside handle lever 62 to rotate anticlockwise as shown in FIG. 6 such that clutch pin 70 contacts clutch abutment 78 of inside release lever 64 causing inside lever 64 to also rotate anticlockwise resulting in opening of the door.

However when the clutch pin 70 is moved to an upper portion of slot 72 operation of the inside door handle results in clutch pin 70 passing over clutch abutment 78 resulting in a door that cannot be opened by operation of the inside door handle (child safety on).

Clutch pin 70 can be moved up or down slot 72 either by actuation of the motor or by manual means as follows.

Motor actuation causes output means 14 to move between first and second positions. The co-operation of pin 80 with arcuate slot 54 causes the child safety link 68 to move to a raised or lowered position thus positioning clutch pin 70 in a raised or lowered position. Raising or lowering of the child safety link 68 by the motor has the result of rotating the child safety-operating crank.

Alternatively rotation of the child safety operating crank by insertion of a screwdriver or the like into slot 82 causes clutch pin 70 to move between an upper and lower position. Such manual movement causes pin 80 to drive the output means 14 between its lower first position and upper second position. Because the first and second positions of the output means 14 are detent positions, the detent can be felt by an operator rotating the child safety operating crank with a screwdriver or the like. Thus the operator can be confident that the child safety is on or off as appropriate.

As mentioned above the power actuator arrangement is not limited to changing the state of a latch between a child safety on and child safety off condition.

Figure 7:
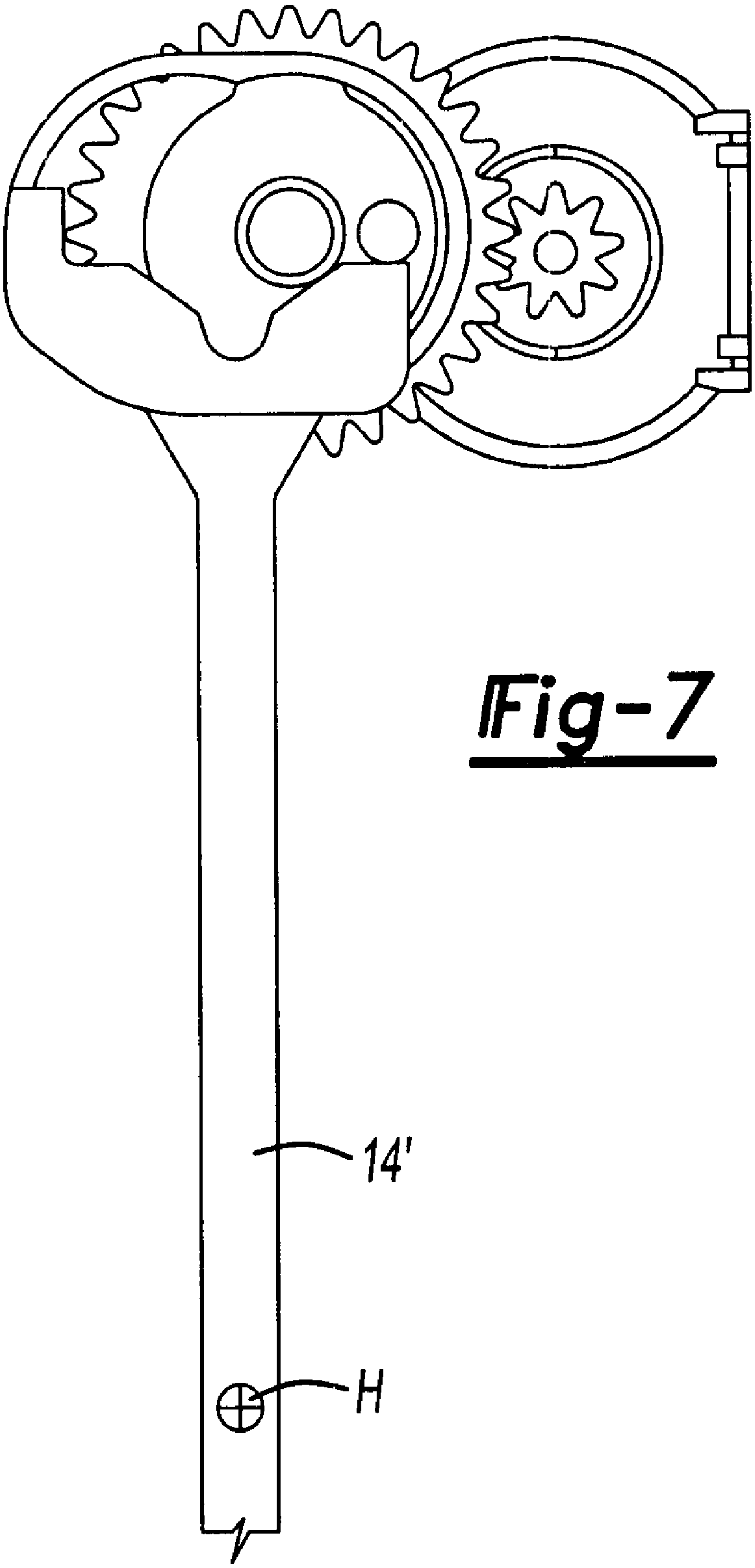
FIG. 7 is a view of a further power actuator according to the present invention.

Furthermore the output means need not operate in a linear manner but could be arranged as a lever 14' (see FIG. 7) pivotable about axis 11.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A power actuator arrangement comprising:

a power drive assembly having a first powered position and a second powered position; and an output member being moveable by said power drive assembly between a first detent position corresponding to said first powered position and a second detent position corresponding to said second powered position following powered operation, said output member being retained in said first or second detent positions by a detent bias force provided by a detent arrangement, said output member being independently moveable by an independent force between said first and second detent positions, said independent force acting to overcome said detent bias force such that during independent movement said independent force substantially does not act to move said power drive assembly between said first powered and second powered positions.

2. The power actuator arrangement as recited in claim 1 wherein said detent bias force acts substantially symmetrically on a first member of said power drive assembly.

3. The power actuator arrangement as recited in claim 2 wherein said first member rotates between said first and second powered positions of said power drive assembly.

4. The power actuator arrangement as recited in claim 1 wherein said power actuator arrangement includes a power actuator and a transmission path in which during powered movement said power actuator has to overcome a reduced detent bias force.

5. The power actuator arrangement as recited in claim 4 wherein said reduced detent bias force is substantially zero.

6. The power actuator arrangement as recited in claim 1 wherein said detent arrangement has a first member having a first and a second outwardly facing surfaces, with a corresponding first and second inwardly facing surfaces of a second member of said detent arrangement.

7. The power actuator arrangement as recited in claim 6 wherein at least one of said first ad second inwardly facing surfaces is resiliently mounted to provide for said detent bias force.

8. The power actuator arrangement as recited in claim 6 wherein said first and second outwardly facing surfaces abut said first and second inwardly facing surfaces during independent movement of said output member by said independent force between said first detent and second detent positions.

9. The power actuator arrangement as recited in claim 6 wherein said first and second outwardly facing surfaces do not abut said first and second inwardly facing surfaces during powered movement of said output member by said power drive assembly between said first detent and second detent positions.

10. The power actuator arrangement as recited in claim 6 wherein said first member includes a third and fourth outwardly facing surfaces, a maximum distance between said third and fourth outwardly surfaces being less than a maximum distance between said first and second outwardly facing surfaces such that when said third and fourth outwardly facing surfaces are aligned with said first and second inwardly facing surfaces said detent bias force is reduced.

11. The power actuator arrangement as recited in claim 10 wherein said third and fourth outwardly facing surfaces at least partially align with said first and second inwardly facing surfaces during at least a portion of powered movement of said output member by said power drive assembly between said first detent and second positions.

12. The power actuator arrangement as recited in claim 10 wherein said maximum distance between said third and fourth outwardly facing surfaces is less than a minimum distance between said first and second inwardly facing surfaces.

13. The power actuator arrangement as recited in claim 10 wherein said maximum distance between said third and fourth outwardly facing surfaces is substantially the same as a minimum distance between said first and second inwardly facing surfaces.

14. The power actuator arrangement as recited in claim 6 wherein said first and second outwardly facing surfaces are arcs of a common circle.

15. The power actuator arrangement as recited in claim 6 wherein said first and second outwardly facing surfaces are symmetrically disposed about said first member.

16. The power actuator arrangement as recited in claim 9 wherein said third and fourth outwardly facing surfaces are arcs of a common circle.

17. The power actuator arrangement as recited in claim 9 wherein said third and fourth outwardly facing surfaces are symmetrically disposed about said first member.

18. The power actuator arrangement as recited in claim 16 wherein an axis of said common circle of said first and second outwardly facing surfaces is the same as an axis of said common circle of said third and fourth outwardly facing surfaces.

19. The power actuator arrangement as recited in claim 2 wherein said first member is rotatably fast with a gear of said power drive assembly.

20. The power actuator arrangement as recited in claim 2 wherein said first member includes a drive formation for powered movement of said output member.

21. The power actuator arrangement as recited in claim 6 wherein each of said first and second inwardly facing surfaces of said second member comprises two arcuate portions.

22. The power actuator arrangement as recited in claim 21 wherein a portion of said first inwardly facing surface is part of a circle common with a portion of said second inwardly facing surface.

23. The power actuator arrangement as recited in claim 1 wherein said output member includes a drive abutment engageable by said power drive assembly to move said output member between said first and second positions.

24. The power actuator arrangement as recited in claim 1 wherein said output member includes at least one stop abutment which limits movement of said power drive assembly.

25. The power actuator as recited in claim 24 wherein said stop abutment is engageable by a power drive assembly abutment.

26. The power actuator as recited in claim 24 wherein a direction of engagement of a power drive assembly abutment with said stop abutment is not the same as said direction of movement of said output member between said first and second positions.

27. The power actuator arrangement as recited in claim 26 wherein said direction of engagement of said power drive assembly abutment with said stop abutment is substantially perpendicular to said direction of movement of said output member between said first and second positions.

28. The power actuator arrangement as recited in claim 3 wherein said first member rotates through greater than 360° and preferably substantially 540° during powered movement of said output member between said first and second positions.

29. The power actuator arrangement as recited in claim 3 wherein said first member rotates through less than 360° and preferably through 180° during powered operation of said power drive assembly following independent movement of said output member between said first and second positions.

30. The power actuator arrangement as recited in claim 6 wherein a flange of said second member partially overlays said first member.

31. The power actuator arrangement as recited in claim 30 wherein said flange includes at least one of a drive slot, a first abutment stop and a second abutment stop.

32. The power actuator arrangement as recited in claim 6 wherein one of said first and second inwardly facing surfaces is substantially rigid.

33. The power actuator arrangement as recited in claim 32 wherein said one of said first and second inwardly facing surfaces is rigid due to said adjacent flange.

34. The power actuator arrangement as recited in claim 6 wherein said second member surrounds said first member.

35. The power actuator arrangement as recited in claim 6 wherein said second member is made from a resilient plastics material.

36. A power actuator arrangement as recited in claim 1 wherein said output member is linearly moveable between said first detent position and said second detent position.

37. A power actuator arrangement including a power drive assembly and an output member, said output member being movable by said power drive assembly between first and second positions and being independently movable by an independent force between said first and second positions such that said first and second positions are detent positions and during independent movement between said first and second positions said independent force has to overcome a detent force wherein said power drive assembly has to overcome a reduced detent force when moving said output member between said first and second positions.

* * * * *